United States Patent

[11] 3,616,929

| [72] | Inventor | Serop Manjikian<br>Del Mar, Calif. |
|---|---|---|
| [21] | Appl. No. | 39,104 |
| [22] | Filed | May 20, 1970 |
| [45] | Patented | Nov. 2, 1971 |
| [73] | Assignee | Universal Water Corporation<br>Del Mar, Calif.<br>Continuation-in-part of application Ser. No. 818,514, Apr. 23, 1969. |

[54] REVERSE OSMOSIS MODULE
12 Claims, 10 Drawing Figs.

[52] U.S. Cl.................................................. 210/321,
210/335, 210/433, 210/456, 210/497.1
[51] Int. Cl.................................................. B01d 31/00
[50] Field of Search........................................... 210/456,
23, 321, 447.1, 445, 441, 459, 433, 450, 452, 335, 334, 345, 323

[56] References Cited
UNITED STATES PATENTS

| 2,987,472 | 6/1961 | Kollsman...................... | 210/321 X |
| 3,341,024 | 9/1967 | Lowe et al. .................. | 210/490 |
| 3,400,825 | 9/1968 | Shippey....................... | 210/433 X |

*Primary Examiner*—Frank A. Spear, Jr.
*Attorney*—Clement H. Allen

ABSTRACT: A module, useful in systems for treatment of liquids by reverse osmosis, comprises a pressure-resistant container in which are supported one or more membrane elements having helically wound membrane strips around their outer surfaces. A feed inlet, brine outlet and product water connection are provided for the module. A central dummy element or baffles may be employed to distribute feed liquid over the membrane element surfaces.

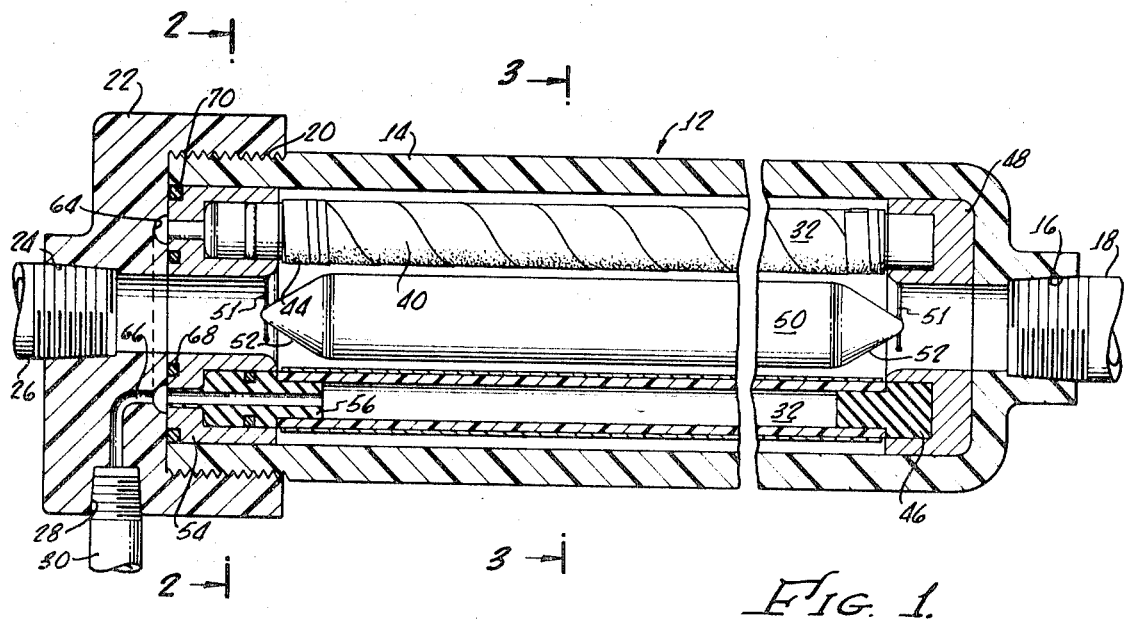

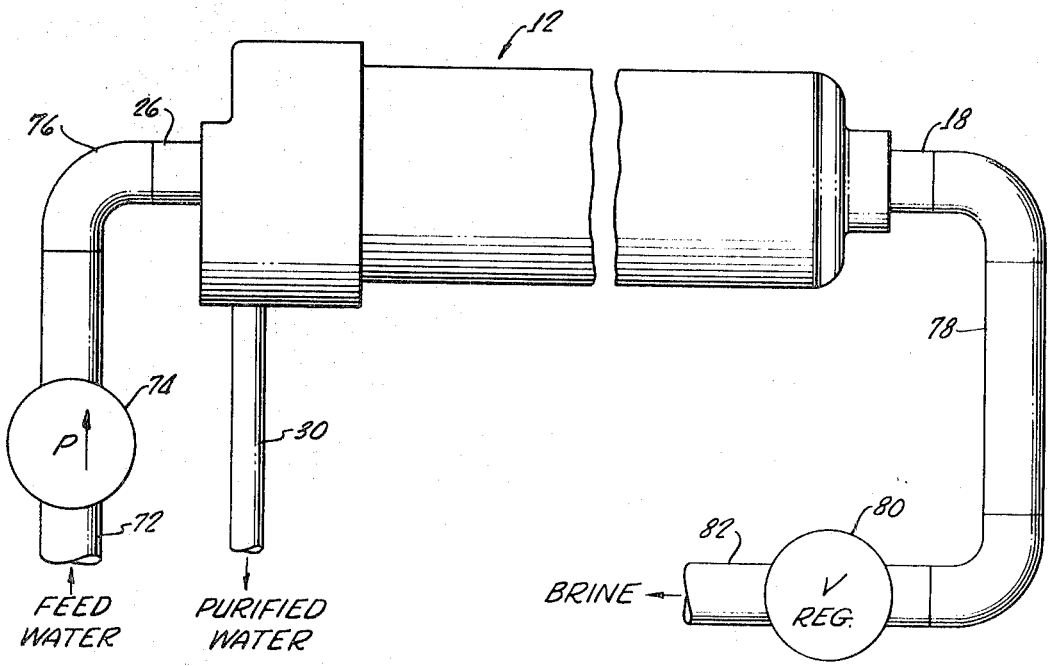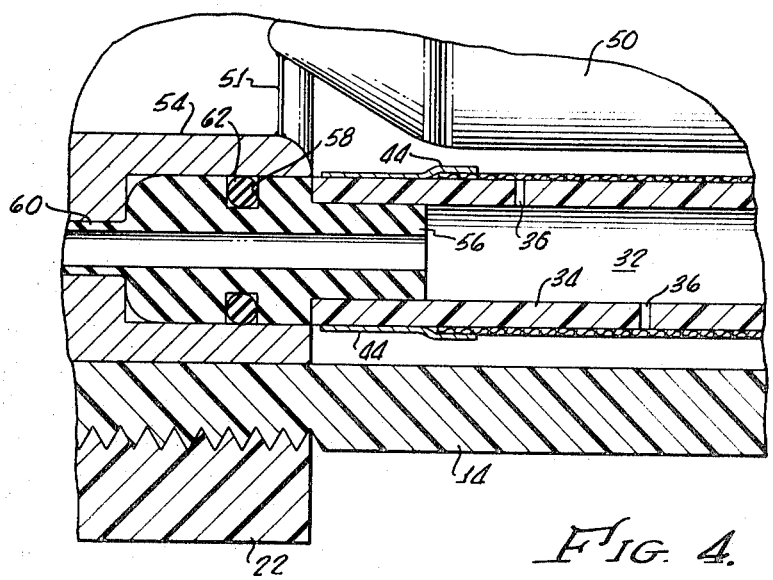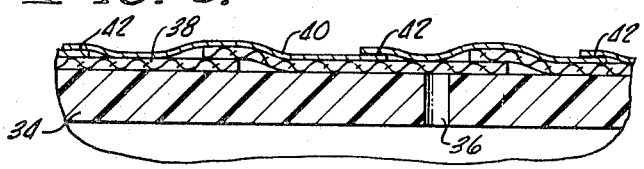

INVENTOR.
SEROP MANJIKIAN

BY

AGENT.

REVERSE OSMOSIS MODULE

This application is a continuation-in-part of my application Ser. No. 818,514 filed Apr. 23, 1969.

This invention relates to apparatus for treatment of liquids by reverse osmosis, and more particularly to a module containing one or more elements having outer surfaces covered with semipermeable membranes.

Reverse osmosis, when used, for example, for desalting of saline water, is accomplished by applying the saline water under pressure to one side of a semipermeable membrane which permits the passage of water but prevents passage of salts. The basic principles of reverse osmosis are well known and various types of membranes and structures for supporting the membranes have been developed. One type of desalination unit employs flat membranes which are supported on porous plates or grids, a number of plates and membranes being stacked into a plate and frame assembly. Another type of module uses a sheetlike porous element interleaved with a semipermeable membrane sheet, the combination being rolled into a spiral; feed water is fed into one end and brine flows out of the other, product water being collected from the porous sheet. Yet another type employs porous wall, pressure-resistant tubes with semipermeable membrane tubes on their inner surfaces. None of these types, however, solved fundamental problems, namely to provide a membrane module which is economical to produce and efficient in operation yet is based on a membrane support design which permits simple and inexpensive cleaning or replacement of membranes when these become fouled or inefficient after a period of use.

Summarized briefly the reverse osmosis module of this invention comprises a pressure-resistant container in which are mounted at least one, and preferably a plurality, of elongated membrane elements formed by helically winding membrane strips over the outer surfaces of elongated cores having a middle porous section and ends having impervious peripheral surfaces. Reference to impervious peripheral surfaces of membrane element core ends is intended to mean the circumferential or peripheral surfaces, not the end surfaces themselves which are bored or porous to permit longitudinal flow of purified liquid. Preferably the cores are provided with internal bores for collection of purified liquid. The helical membrane strip windings are sealed where adjacent turns meet or overlap, and the ends of the membrane windings are sealed to the impervious core end surfaces. The membrane element ends engage support structures to maintain the membrane elements in proper spaced relation, one of such support structures being bored to permit transfer of purified liquid from the interior of the cores to a purified liquid collection system. The pressure-resistant container is provided with a feed liquid inlet and a concentrated liquid or brine outlet, which are arranged to provide flow of feed liquid over the membrane surfaces, and a purified liquid outlet connection. Preferably a central dummy element or baffles are arranged to provide advantageous feed liquid distribution over the membrane covered surfaces of the membrane elements.

Details of the construction and operation of this invention will become more readily apparent from the following description thereof and from the annexed drawings in which:

FIG. 1 shows a vertical central sectional view of a module embodying features of this invention.

FIG. 2 shows a cross section view of the module of FIG. 1 taken along the line 2—2.

FIG. 3 shows a cross section view of the module of FIG. 1 taken along the line 3—3.

FIG. 4 shows a fragmentary and enlarged view in vertical section of the sealing of a membrane element to its support structure.

FIG. 5 shows a fragmentary and enlarged view in vertical section of a membrane element wall with its backing and membrane strip windings.

FIG. 6 illustrates a reverse osmosis system employing a module embodying features of this invention.

Figure 7:
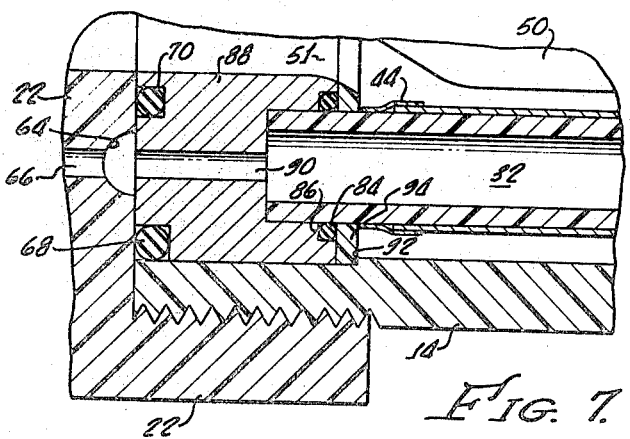
FIG. 7 shows a fragmentary and enlarged view in vertical section of an alternative method of sealing a membrane element end to its support structure.

Referring now to FIGS. 1 to 5 the module 12 useful, for example, for desalting saline water is formed with an outer shell 14 which may be fabricated of suitable pressure-resistant material such as high-strength plastic. One end of shell 14, at the right hand as illustrated in the drawings, has a threaded bore as at 16 to take an outlet connection 18. At the other end, shell 14 is threaded as at 20 and on to which is screwed end cap 22. A threaded bore as at 24 enables a feed liquid connector pipe 26 to be attached as shown, and another threaded bore as at 28 enables purified liquid connection 30 to also be attached.

Inside shell 14 are arranged one or more membrane elements indicated generally at 32, a plurality of six shown by way of example. These membrane elements are more particularly described and specifically claimed in my copending application Ser. No. 818,514 filed Apr. 23, 1969. These membrane elements comprise strong, pressure-resistant core tubes 34 as will be seen more clearly in FIG. 5, the middle portions of which are perforated at intervals as at 36 to make them porous. Over the porous middle surface areas is helically wound a layer 38 of porous backing material such as nylon cloth, filter paper or the like to provide lateral flow of purified liquid to perforations 36 from a superimposed and also helically wound strip of semipermeable membrane 40. The overlapped edges at 42 of membrane strip 40 are sealed as by a suitable adhesive, adhesive tape or solvent welding and each end of wound membrane strip is sealed to the impervious peripheral surface of an end of tube 34 as by adhesive tape winding 44. Into one end of each of tubes 34 is inserted in tight-sealing relationship (as by use of an adhesive or solvent welding) a blind plug 46 whose extending end portion engages or mates with a cavity in end support member or structure 48. The cavities in support member 48 may be arranged to maintain the membrane elements 32 in any desirable pattern or array preferably spaced apart from each other and from the interior walls of shell 14. A convenient arrangement for a six-element group is, as shown more clearly in FIGS. 2 and 3, in a circular pattern around a central space in which is placed a dummy membrane element or flow control element 50, which is maintained centrally by wire spacers 51. Tapered ends 52 on flow control element 50 distribute feed water entering module 12 through connector 26 and passing through a bore in a second membrane support structure 54, outwardly so that the flow is turbulent around the membrane-covered surfaces of membrane elements 32. At the other end of the module (that is the brine outlet end in the embodiment illustrated in FIG. 1) the brine flow is directed smoothly through the bore in support structure 48 and to exit through brine connector 18.

Means are provided for collecting purified liquid which passes through membrane strips 40, passes laterally through nylon cloth layer 38, through holes 36 and into the interior of membrane element core tubes 34. Such means, as will be seen more clearly in FIG. 4, comprises bored plugs 56 which are fitted to the other ends of core tubes 34 in tight-sealed relationship, as by use of an adhesive or solvent welding. Plugs 56 are provided with peripheral grooves 58 in their extending portions, and have delivery tubes or end sections as at 60. O-ring gaskets 62 are placed in grooves 58 to seal plugs 56 to the walls of a mating cavities in a second support element or structure 54 while delivery tube end sections 60 connect the internal bores in plugs 56 to a facing annular collector channel 64 in the interior face of end cap 22. A conduit 66 in end cap 22 connects channel 64 with the bore 28 into which is threaded purified liquid connector 30. Inner O-ring gasket 68 and outer O-ring gasket 70 are arranged concentrically with respect to channel 64, one outside and one inside, and are placed in conventional grooves in support element 54 so that they may seal against the adjacent face of end cap 22.

The module of this invention will be used in a system which will provide feed liquid, for example water, under suitable pressure and means for maintaining liquid pressure within the module while releasing a predetermined flow of brine. A representative system is shown in FIG. 6 in which feed water, which will ordinarily be impure with respect to soluble salts or other impurities, is supplied by pipe 72 to the inlet of high-pressure pump 74 from where the feed water is transferred through pipe 76 to the feed inlet connector 26 of module 12. While feed water, and eventually brine, passes through module 12, purified water is collected from the interior of the membrane elements (32 in FIG. 1) and released through connector 30; and the brine, more concentrated in salts contained in the feed water passes out of module 12 through brine connector 18 thence through pipe 78 to pressure regulator valve 80. A predetermined outflow of brine is maintained from brine discharge connector 82 by back pressure valve 80 which also maintains proper liquid pressure inside the module 12.

An alternative method for sealing the product water ends of the membrane elements 32 is shown in FIG. 7. In this embodiment the end seal is made directly to the peripheral, impervious end surface of core tube 34 as by provision of O-ring 84 in groove 86 in the support element 88 which is itself sealed to end cap 22 by O-rings 68 and 70 as previously described with reference to the embodiment of FIG. 1. Support element 88 is provided with bores 90 communicating at their inner ends with the interiors of core tubes 34 and at their outer ends communicating with the annular collector channel 64 in end cap 22. The module shell 14 is of modified design being provided with retaining means comprising a cutout end portion forming shoulder 92 against which bears a perforated plate 94 which surrounds membrane elements 32 and has a suitable central aperture for liquid passage as shown. This modification provides excellent sealing of the membrane element end surfaces. When end cap 22 is screwed tight on the end of shell 14, O-ring 84 will be compressed in its groove 86 by pressure exerted by support element 88 in the direction of plate 94 which is itself held firmly against such pressure by bearing against shoulder 92 in shell 14. O-rings 70 and 68 will also be compressed in their holding grooves to provide tight and effective sealing of the outer end face of support member 88 against the inner face of end cap 22 thus providing inner and outer annular seals around product water channel 64.

Figure 8:
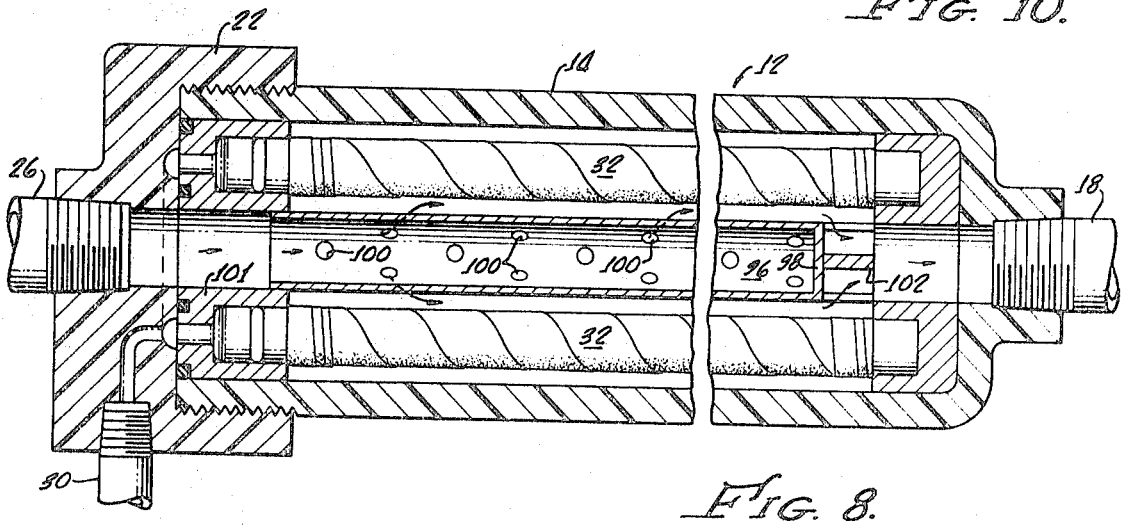
FIG. 8 shows an alternative method of distributing the flow of feed liquid over the surfaces of a plurality of membrane elements.

In FIG. 8 is shown an alternative method for distributing the feed water flow over the membrane covered surfaces of the membrane elements. In this embodiment a central hollow dummy element 96 is employed, open at the feed water end and closed by plate 98 at the brine end. The walls of tube 96 are perforated at intervals as at 100 so that feed water entering the tube through support structure 101 is distributed over the length of membrane elements 32. At the outlet or brine end, tube 96 is fitted with cage 102 which maintains it in spaced relation to brine end support element 104 and feed end support element 106, and through which brine can freely flow to be released from the module through brine connector 18.

Figure 10:
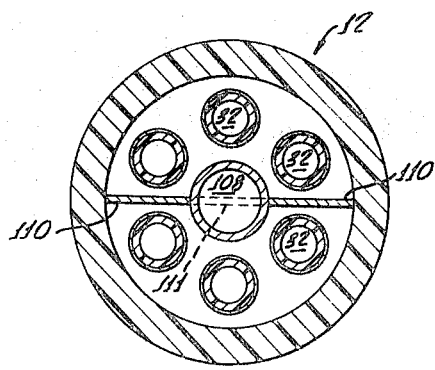
FIG. 10 shows a vertical section of the module of FIG. 9 taken along the line 10—10.
Figure 9:
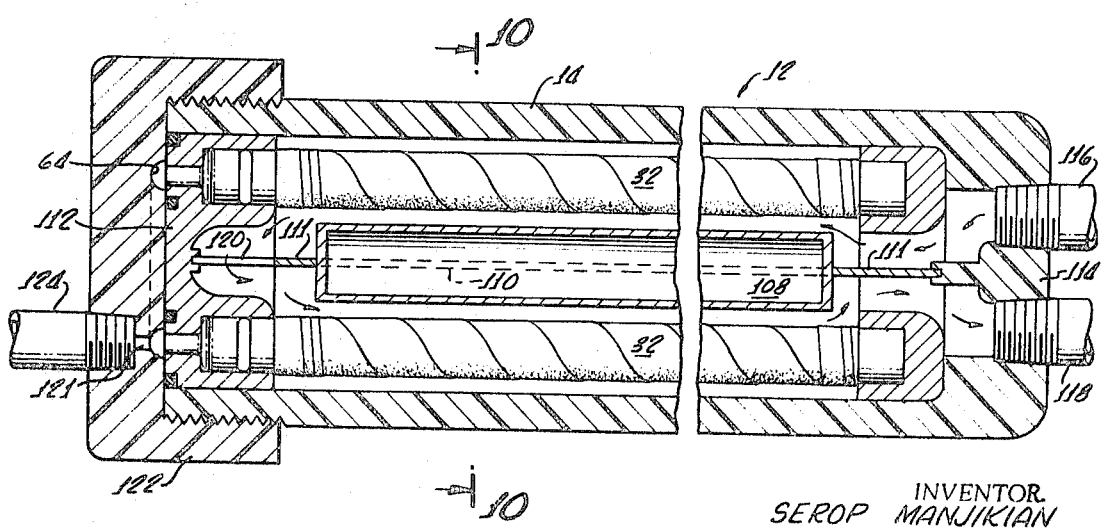
FIG. 9 shows another alternative method of distributing the flow of feed liquid over the surfaces of a plurality of membrane elements so that the feed liquid first passes over the surfaces of one group of elements and then successively over the surfaces of a second group.

In FIGS. 9 and 10 is shown a modification of the feed water distribution system in module 12 in which a central dummy tube 108 is employed having laterally extending sideplates or baffles 110 which join at each end of dummy element 108 to form end plates 111 which are supported at one end by fitting into a slot in support member 112, and at the other end by fitting into a slot in end 114 of shell 14 which is modified to provide feed inlet connector 116 and brine outlet connector 118 on opposite sides of end plate 111. At the interior end, plate 111 is provided with hole 120 for free passage of liquid. Thus plates 110 and 111 in effect form baffles, or means for dividing the interior of module 12 into a plurality of compartments, two in the example illustrated, each compartment containing selected groups of membrane elements. The feed water enters through connector 116 being distributed by end plate 111, sideplates 110 and dummy tube 108 around the upper three membrane elements (as illustrated) then it passes through aperture 120 in end plate 111 and back around the lower three membrane elements and out brine connector 118. A suitable conduit 121 connects the product water channel 64 in a modified end cap 122 to product water connector 124. This embodiment provides inlet and outlet for the feed and brine at the same end of the module and by reason of the separation effected by plates 110 and 111 produces a longer travel path for the feed solution since the membrane elements are in effect split into two selected groups which are connected in series.

In operation, the module of this invention may be employed in a reverse osmosis system. The module of FIG. 1, for example, may be employed as shown in FIG. 6 for purifying brackish water to produce potable water. Referring to FIG. 6 as an illustrative operating example, brackish water of 2000 p.p.m. total dissolved solids may be introduced through feed inlet 72 to pump 74 where its pressure is raised to 600 p.s.i.g. The high-pressure feed solution enters module 12 through inlet 26 and is distributed over the membrane covered surfaces of the membrane elements. Reverse osmosis causes purified water to pass through the membranes to the product water collection system and it is recovered from connector 30. The product water will contain about 300 p.p.m. total dissolved solids. The feed water in module 12, now more concentrated in salts and termed brine, is released from module 12 through connector 18 and passes through pipe 78 to back pressure regulator valve 80. This valve is set to maintain a 600 p.s.i.g. pressure in module 12 and release brine through connector 82. Typical operation will result in a 50 percent recovery of feed water as purified product water of 300 p.p.m., the brine, containing about 3,700 p.p.m. total dissolved solids, may be discarded to sewer.

The module 12 may be produced within a wide size range, its length being limited by mechanical considerations of membrane element stiffness and assembly. The number of membrane elements may also vary widely and various diameters and numbers of elements may be employed in a variety of packing arrays. The outside diameter of the module may be limited by considerations of material strength, wall thickness and other mechanical factors depending on the operating pressure.

The module of this invention is efficient in operation because the feed solution can be distributed in turbulent flow over the membrane covered outer surfaces of the membrane elements. This results in reduction or elimination of a boundary layer of solution containing high salt content which will seriously reduce osmotic efficiency. The membrane elements are readily removed from the module for cleaning and replacement. Considering the embodiment of FIG. 1, for example, the end cap 22 may be unscrewed and the two-element support structures 54 and 48 with the membrane elements in place may be removed as a unit from shell 14. Removal of the elements as a unit and the fact that the membranes are on the outside of the element cores permits the membrane surfaces to be readily cleaned as by washing off with a stream or jet of water. This will remove deposits and scum which ordinarily collect on the membrane surfaces and substantially reduce their efficiency. Additionally it is a simple matter to replace membrane elements when this becomes necessary. Membrane elements may be replaced individually if necessary or desirable, their ends being simply slipped out of their mating cavities in support elements 48 and 54. A whole new set of membrane elements may be replaced when operating characteristics have declined to the point where this is required. After the new set has been placed in position in their support elements the assembly or cartridge is slipped back into shell 14, end cap 22 is replaced and the module is thus remembraned. If desired, the old membrane elements may themselves be renewed by removing the helically wound membrane layer and, if also necessary, the nylon cloth layer or layers, and replacing these on the old cores. A stock of renewed membrane elements may be kept on hand for simple and ready replacement when necessary.

The module of this invention is useful in reverse osmosis systems designed for the various purposes for which this process is becoming applicable. It may be employed for purifying household water to produce a premium quality product similar to so-called bottled water. It may be used for purification of otherwise unpotable brackish water for homes, farms, ranches, municipal supplies and industrial uses. It may be used for desalting sea water. It may also be used in processes in which reverse osmosis is used to produce primarily a concentrate rather than a purified product. Fruit juices, beverages and other comestibles and commercial liquids may be treated to separate water and produce a concentrate.

I claim:

1. A module, adapted for use in a reverse osmosis system comprising, a pressure-resistant container, at least one membrane element in said container, means for introducing feed liquid under pressure into said container, and means for exhausting concentrated liquid from said container; in which the improvements comprise:
   a. said membrane element comprising an elongated core having a porous central portion and end portions having impervious outer surfaces and a semipermeable membrane strip helically wound over the outside surface of the porous central portion of said core, the edges of adjacent turns of said helically wound membrane strip being sealed together and the ends of said helical windings being sealed to the impervious surfaces of the end portions of said core;
   b. means for supporting said membrane element in said pressure-resistant container by one sealed end engaging a cavity in a support structure, the other end of said membrane element communicating with product water-collecting means and having an O-ring gasket surrounding the impervious surface of the other end of said membrane element, said O-ring being compressed between said support structure and a plate surrounding said membrane element and bearing against retaining means in the shell of said container; and,
   c. means for collecting purified liquid from the core of said membrane element.

2. A module according to claim 1 having a plurality of said membrane elements in said pressure-resistant container.

3. A module according to claim 1 in which said retaining means comprises a shoulder in the inner wall of the shell of said container.

4. A module, adapted for use in a reverse osmosis system comprising, a pressure-resistant container, at least one membrane element in said container, means for introducing feed liquid under pressure into said contain, and means for exhausting concentrated liquid from said container; in which the improvements comprise:
   a. said membrane element comprising an elongated core having a porous central portion and end portions having impervious outer surfaces and a semipermeable membrane strip helically wound over the outside surface of the porous central portion of said core, the edges of adjacent turns of said helically wound membrane strip being sealed together and the ends of said helical windings being sealed to the impervious surfaces of the end portions of said core;
   b. said membrane element being provided at one end with a blind plug which engages a cavity in a support structure, and is provided at the other end with a bored plug with the bore of said plug communicating with product water-collecting means, and an O-ring gasket encircling said bored plug and sealing said plug to walls of a cavity in a second support structure; and,
   c. means for collecting purified liquid from the core of said membrane element.

5. A module according to claim 4 in which said membrane element is provided at one end with a blind plug which mates with a cavity in a support structure and is provided at the other end with a bored plug with the bore of said plug communicating with purified liquid-collecting means, said bored plug having a shoulder, and said bored plug mating with a stepped cavity in a second support structure, and an O-ring gasket encircling said bored plug between its shoulder and the step in said stepped cavity to seal said bored plug to the walls of said stepped cavity in said second support structure.

6. A module, adapted for use in a reverse osmosis system comprising, a pressure-resistant container, a plurality of membrane elements in said container, means for introducing feed liquid under pressure into said container, and means for exhausting concentrated liquid from said container; in which the improvements comprise:
   a. said membrane elements each comprising an elongated core having a porous central portion and end portions having impervious outer surfaces and a semipermeable membrane strip helically wound over the outside surface of the porous central portion of said core, the edges of adjacent turns of said helically wound membrane strip being sealed together and the ends of said helical windings being sealed to the impervious surfaces of the end portion of said core;
   b. support structure removably engaging the end portions of said membrane elements to maintain said elements in spaced relation to the inner walls of said pressure-resistant container;
   c. said plurality of membrane elements being arranged symmetrically around a central dummy element which distributes feed liquid over the surfaces of said membrane elements; and,
   d. means for collecting purified liquid from the cores of said membrane elements.

7. A module according to claim 6 in which said dummy element has a pointed end.

8. A module according to claim 6 in which said dummy element is hollow and is connected at one end to feed liquid supply means, and is provided with perforations in its sidewall to distribute feed water over the surface of said membrane elements.

9. A module, adapted for use in a reverse osmosis system comprising, a pressure-resistant container, a plurality of membrane elements in said container, means for introducing feed liquid under pressure into said container, and means for exhausting concentrated liquid from said container; in which the improvements comprise:
   a. said membrane elements each comprising an elongated core having a porous central portion and end portions having impervious outer surfaces and a semipermeable membrane strip helically wound over the outside surface of the porous central portion of said core, the edges of adjacent turns of said helically wound membrane strip being sealed together and the ends of said helical windings being sealed to the impervious surfaces of the end portions of said core;
   b. support structure removably engaging the end portions of said membrane elements to maintain said elements in spaced relation to the inner walls of said pressure-resistant container; membrane
   c. dividing means separating the space around said membrane elements into a plurality of compartments, said compartments being connected at their ends to cause liquid flow around selected membrane elements in series; and,
   d. means for collecting purified liquid from the cores of said membrane elements.

10. A module according to claim 9 in which dividing means separates the space around said membrane elements into a plurality of compartments said compartments being connected at their ends to cause liquid flow around selected groups of said elements in series.

11. A module according to claim 10 in which two of said compartments each contain one-half of the number of membrane elements in said container.

12. A module according to claim 10 in which said dividing means comprises a central dummy element having laterally extending sideplates.